No. 751,239. PATENTED FEB. 2, 1904.
E. B. ALLEN.
BUTTONHOLE STITCHING MACHINE.
APPLICATION FILED JULY 24, 1902.
NO MODEL. 8 SHEETS—SHEET 1.

Witnesses:
Inventor
E. B. Allen

No. 751,239.

PATENTED FEB. 2, 1904.

E. B. ALLEN.
BUTTONHOLE STITCHING MACHINE.
APPLICATION FILED JULY 24, 1902.

NO MODEL.

Witnesses:

Inventor:
E. B. Allen
by Henry Calver
Atty.

No. 751,239. PATENTED FEB. 2, 1904.
E. B. ALLEN.
BUTTONHOLE STITCHING MACHINE.
APPLICATION FILED JULY 24, 1902.
NO MODEL. 8 SHEETS—SHEET 3.

No. 751,239. PATENTED FEB. 2, 1904.
E. B. ALLEN.
BUTTONHOLE STITCHING MACHINE.
APPLICATION FILED JULY 24, 1902.
NO MODEL.
8 SHEETS—SHEET 4.

Fig. 4.

Witnesses:
Inventor.
E. B. Allen
by Henry Calver
Atty.

No. 751,239. PATENTED FEB. 2, 1904.
E. B. ALLEN.
BUTTONHOLE STITCHING MACHINE.
APPLICATION FILED JULY 24, 1902.
NO MODEL. 8 SHEETS—SHEET 5.

No. 751,239.

PATENTED FEB. 2, 1904.

E. B. ALLEN.
BUTTONHOLE STITCHING MACHINE.
APPLICATION FILED JULY 24, 1902.

NO MODEL.

Witnesses:

Inventor.
E. B. Allen

No. 751,239. PATENTED FEB. 2, 1904.
E. B. ALLEN.
BUTTONHOLE STITCHING MACHINE.
APPLICATION FILED JULY 24, 1902.
NO MODEL.
8 SHEETS—SHEET 7.

Witnesses:

Inventor:
E. B. Allen

No. 751,239. PATENTED FEB. 2, 1904.
E. B. ALLEN.
BUTTONHOLE STITCHING MACHINE.
APPLICATION FILED JULY 24, 1902.
NO MODEL.
8 SHEETS—SHEET 8.

Witnesses:
J. B. McGirr.
A. Cushman.

Inventor.
E. B. Allen
by Henry Calver,
Atty.

No. 751,239.

Patented February 2, 1904.

UNITED STATES PATENT OFFICE.

EDWARD B. ALLEN, OF ELIZABETH, NEW JERSEY, ASSIGNOR TO THE SINGER MANUFACTURING COMPANY, A CORPORATION OF NEW JERSEY.

BUTTONHOLE-STITCHING MACHINE.

SPECIFICATION forming part of Letters Patent No. 751,239, dated February 2, 1904.

Application filed July 24, 1902. Serial No. 116,864. (No model.)

*To all whom it may concern:*

Be it known that I, EDWARD B. ALLEN, a citizen of the United States, residing at Elizabeth, in the county of Union and State of New Jersey, have invented certain new and useful Improvements in Buttonhole-Stitching Machines, of which the following is a specification, reference being had therein to the accompanying drawings.

This invention relates to an automatic buttonhole-stitching machine, and pertains more particularly to that class of machines in which the overseaming or buttonhole stitches are formed by moving the needle-bar and needle laterally, so that the needle will descend alternately in different vertical planes for the overedge and the penetrating or depth stitches of the overseam.

The present improved automatic machine contains many novel features of value in buttonhole-stitching machines and some of which are applicable to machines having different stitch-forming mechanisms than that just referred to, although one important feature of the invention relates to the novel means by which the lateral movements of the needle-bar and needle are effected through a mechanism so constructed that whatever may be the extent of the horizontal or lateral movements of the needle in forming the overedge-stitches of the buttonholes such horizontal or lateral movements of the needle will always be proportionally larger when the barring-stitches are being made, so that a single adjustment to vary the lateral throw of the needle-bar and needle will always result in proportional lateral movements of the said needle-bar and needle for the overseaming or edge-covering and the barring stitches. For most kinds of work it is desirable that the barring-stitches should be of a length just double the width of the overseam along the sides of a buttonhole, so as to extend from outside to outside of the two parallel rows of the side stitches of the buttonhole, and thus if the width of the overseam be varied (as is desirable for different kinds of work) the length of the barring-stitches should be proportionally varied, and this by the present invention is effected by the one adjustment affecting the lateral movements of the needle-bar and needle instead of requiring two independent adjustments, as heretofore to this end.

In the operation of the present automatic machine the attendant properly locates the work in the clamp and then by means of a treadle-operated device or lever unlocks the feed-wheel from its returning mechanism and releases the stop-motion device to start the machine running. The needle-bar at its first descent causes, through a suitable connecting-lever, a depression of a cutter or punch operating bar, which automatically closes the clamp and cuts or punches a buttonhole slit or eyelet. The said cutter or punch operating bar then rises at the first ascent of the needle-bar and is automatically disconnected therefrom and locked out of connection therewith until the buttonhole to be made is fully worked. At the commencement of the stitching operation a suitable predetermined number of long barring-stitches are first made across the end of the buttonhole, and the lateral movements of the needle-bar are then automatically changed to the shorter overseaming movements. The clamp is next properly fed or moved beneath the needle to complete the working of the buttonhole, and when this has been accomplished the stitch-forming mechanism is automatically stopped.

The present machine is constructed for working and barring eyed buttonholes, so that the work-clamp is partly turned or given a half-rotation beneath the needle in working the eye portion of a buttonhole, and it is desirable that the clamp should be automatically returned to its first or starting position by reverse movements. To this end a latch connected with the stop-motion mechanism releases a clutch-pin or slide which connects a clamp-returning shaft with a continuously-running shaft operated from the loose pulley of the machine, so as to start said returning-shaft in motion, and simultaneously with the release of the said clutch pin or slide the stop-motion mechanism through suitable connections couples the feed-wheel with the returning mechanism, so that the said feed-wheel will be reversely rotated to reversely move the clamp to its first or starting position. In effecting the reverse movements of the clamp the returning-shaft rotates to effect the return movements of the clamp, said returning-shaft effecting the release of the lever connecting the cutter-bar with the needle-bar and also throwing the barring devices into operative position, so that when the machine is started for the next buttonhole-working operation the buttonhole will first be cut or punched, next barred, and then stitched around, as above described.

In the accompanying drawings.

Referring to the drawings, 12 denotes the bed-plate, and 13 the bracket-arm, of the machine. Journaled in the upper part of the arm 13 is the driving-shaft 14, having at its forward end a crank connected by a pitman 15 with the needle-bar 16 to reciprocate the said needle-bar and the needle 17, carried thereby, vertically in the usual manner. The needle-bar reciprocates vertically in a horizontally-swinging frame or gate 18, mounted on pivot-screws 19 and having a lug or arm 20, connected by a pitman 21 with a swinging arm or lever 22, fulcrumed at its lower end in a supporting-bar 23, rigidly secured to the arm 13.

The driving-shaft 14 is provided with a bevel-gear 24, meshing with a similar bevel-gear 25 at the upper end of a vertical shaft 26, provided at its lower end beneath the work-plate with a crank 27, connected by a pitman 28 with a rock-shaft 29, through which the oscillating shuttle 30 is operated, as is usual in the well-known Singer overseaming-machine. Secured to the said driving-shaft is a second bevel-gear 31, meshing with a larger bevel-gear 32, rigid with a cam-disk or cam-wheel 33, journaled on a suitable stud on the arm 13 and having in its front or outer face a cam-groove 34, entered by a stud 35 on a swinging arm or lever 36, fulcrumed at 37 to the bracket-arm and provided at different distances from its fulcrum or center of motion with the pins 38 and 39.

Jointed at its forward end to the lever 22 is a connecting bar or plate 40, provided at or near its rear end with notches 41 and 42 to receive (alternately) the pins 38 and 39, respectively. The needle-bar frame or gate 18 and the needle-bar reciprocating vertically therein are reciprocated horizontally or laterally from the cam-groove 34 in the cam-wheel 33 (geared to the driving-shaft 14 to perform one rotation to each two rotations of said shaft) through the lever 36, connecting-bar 40, lever 22, and pitman 21; but when the notched rear end of the said connecting-bar 40 is engaged with the pin 38 of the lever 36 the horizontal movements of the needle-bar and needle will be very much less than they will be when said bar 40 is disengaged from the said pin 38 and is engaged with the pin 39 farther from the fulcrum or center of motion of said lever than the pin 38, as will be understood.

The connecting-bar 40 when engaged with the pin 38 is held in engagement with said pin by the lifting coil-spring 43, hooked to said bar and to a small arm 44 on the bracket-arm 13, and the said bar 40 is held in engagement at times with the pin 39 by a bell-crank latch-lever 45, pivoted to the said bar 40 and having its hooked lower end yieldingly pressed toward said pin 39 by the spring 46.

The rear end of the pitman 21 is connected with the lever 22 by means of a sliding pivot-pin 47, vertically adjustable in a slot 48 in said lever and secured in any desired position of adjustment by a set-nut 49, so that by changing the point of connection of the said link nearer to or farther from the fulcrum of said lever the horizontal or lateral movements of the needle-bar and needle imparted thereto from the constant-throw lever 36 will be varied, and the variation of the horizontal throw of the needle-bar and needle for the overedge-stitches and due to the connection of the bar 40 with the pin 38 and the horizontal throw for the longer barring-stitches and resulting from the connection of said bar with the pin 39 will always be proportional whatever may be the position of adjustment of the point of connection of the pitman 21 with the lever 22. In other words, a single adjustment of the pivot-pin 47 in the slot 48 of the lever 22 will increase or decrease the horizontal throw of the needle for the edge-covering or overseaming stitches of a buttonhole and will at the same time proportionally increase or decrease the length of the barring-stitches. Thus if the pins 38 and 39 be so located on the lever 36 that the horizontal barring-throw of the needle is double that of the horizontal edge-stitching throw at any given point of connection of the pitman 21 with the lever 22 an adjustment of the pivot-pin 47 in the slot 48 of the lever 22 will not disturb this relation between the barring-throw and the edge-stitching throw and the barring-stitches will always be of a length which is double the width of the overseam at one side of a buttonhole, so that the barring-stitches will always extend from outside to outside of the two parallel rows of overseaming-stitches at the opposite sides of the buttonhole without requiring a special or second adjustment to maintain the desired proportion between the barring and the overseaming stitches.

The connecting-bar 40 is moved downward from the overseaming position (shown in Fig. 22) to the barring position (shown in Fig. 1) in opposition to the stress of the spring 43 by the transverse lever 50, operated from an eccentric 51 on the clamp-returning shaft 52, and the said bar 40 is automatically disconnected from the barring-stitch pin 39 by means which will now be described. Mounted to slide horizontally on the bar 23 is a ratchet-bar 54. Pivoted to the connecting-bar 40 is a spring-pressed pawl 56, which when the said connecting-bar is depressed, so as to be engaged with the barring-pin 39, is in position to engage the teeth of the said ratchet-bar and feed the same forward a tooth at a time as the said connecting-bar reciprocates horizontally with the swinging lever 36, a spring-pressed detent-pawl 57, having a holding-tooth 55 to engage the teeth of the ratchet-bar to restrain the said ratchet-bar from backward movement under the stress of the spring 58. The ratchet-bar is provided with a tripping-pin 59, so located on said bar that when a desired number of barring-stitches have been formed said pin will engage the depending lower end of the latch-lever 45 and unhook it from its engagement with the pin 39, and thus allow the lifting-spring 43 to raise the connecting-bar out of engagement with the barring-pin 39 and into engagement with the over-seaming-pin 38. This lifting movement of the rear end of the connecting-bar 40 raises the feed-pawl 56 out of engagement with the teeth of the ratchet-bar by reason of the engagement of the tailpiece of said pawl with a pin 11 on the arm 13, and the detent-pawl 57 is simultaneously disengaged from the teeth of the said ratchet-bar by a pin 78, carried by the pawl 56 and engaging the under side of the rear end part of the said detent-pawl.

Fixed to the driving-shaft 14 is a clutch-wheel 59, encircled by an annular flange of the loose pulley 60 and having a clutch connection with the said pulley, as described in my United States Patent No. 524,996, of August 28, 1894, through a spring-pressed clutch-dog 61, mounted on the said clutch-wheel and rotating therewith. Journaled in a bracket 62, fixed to the bracket-arm 13, is a transverse rock-shaft 63, having a clutch-controlling arm 64, acted on by a spring 651, having a tendency to force said clutch-controlling arm toward the said clutch-dog, said arm being, however, held away from the path of movement of the said clutch-dog, rotating with the said clutch-wheel when the machine is running, by a tripping-lever 65, pivoted beneath the work-plate of the machine and having a notch 66, in which rests the lower end of a depending arm 67, fixed to the said shaft 63. Beneath the work-plate of the machine is a treadle-operated rock-shaft 68, having an arm 69 to be suitably connected with a treadle and having a second arm 691, connected by a link 70 with the arm 67, so that to start the machine running the arm 69 is lifted, thus moving the arm 67 to the right, Fig. 1, and the clutch-controlling arm 64 to the left to disengage said clutch-controlling arm from the clutch-dog, with which it becomes engaged when the machine is stopped, as will hereinafter appear.

Connected with the loose pulley 60 to rotate continuously therewith is a short shaft 71, journaled in the bracket 62 and provided with a worm 72, meshing with a worm-wheel 73, rigid with which is a bevel-gear 74, meshing with a bevel-gear 741 on a short shaft 75, having a clutch-head 76, provided with a series of notches 77. Journaled in suitable bearings in the rear side of the bracket-arm is a clamp-returning shaft 52, having adjacent or contiguous to the clutch-head 76 a hub or clutch-head 79, in which is mounted a radially-movable pin 80, having a lug 82 adapted to be engaged with any one of the notches 77 in the clutch-head 76, said pin being pressed outward in its bearings in the clutch-head 79 in position to engage a notch 77 by a spring 81.

The pin 80 is forced inward to disengage it from the continuously-running clutch-head 76 after a rotation has been imparted to the shaft 52 by a pivoted dog 83, acted on by a spring 84 to draw said dog against a stop-pin 86, in which position said dog will be in the path of movement of the outer end of the pin 80, so that the engagement of said pin with an inclined face at the lower end of said dog will force the pin inward to disconnect the said lug 82 from the clutch-head 76, and the rotation of the shaft 52 will be arrested by a shoulder 87 on the said dog and against which the said pin will strike when the inclined face of the dog has disengaged the lug from the clutch-head 76.

Figure 2:
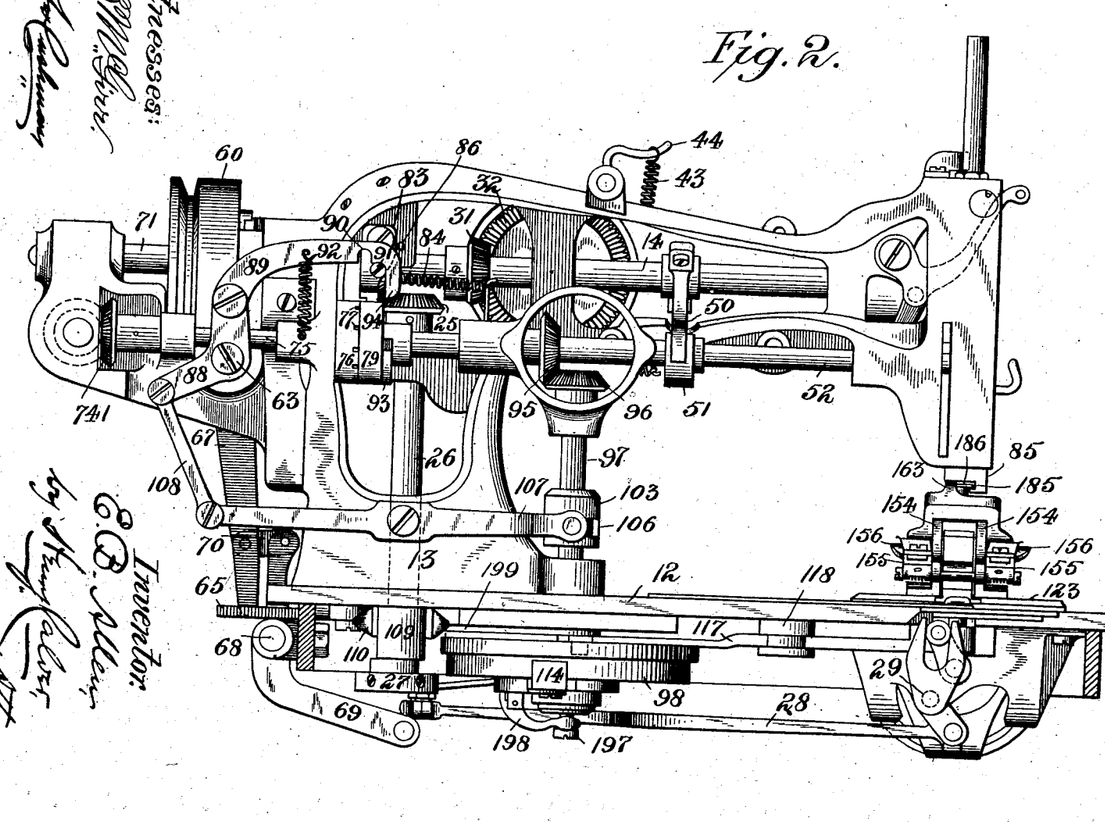

Fixed to the transverse rock-shaft 63 is an angular plate 88, forming a bell-crank lever, and to the upper arm of which is pivoted a latch 89, having a notch 90 near its free end to engage a pin 91 on the pivoted dog 83, a spring 92 drawing the free end of said latch downward toward said pin, with which the said notch is engaged while the machine is running; but when the clutch-controlling arm 64 on the rock-shaft 63 is moved into position to stop the operation of the stitch forming and feeding mechanism of the machine the latch 89 draws the dog 83 to the left, Fig. 2, out of engagement with the pin 82 on the coupling-slide 80, thereby enabling said slide by the action of the spring 81 to couple the continuously-running shaft 75 to the shaft 52. Before the said shaft 52 has performed a rotation a cam 93 on the clutch-head 79 comes into contact with a depending finger 94 of the latch 89, thus lifting said latch to free it from engagement with the pin 91 of the dog 83, so that the spring 84 will draw said dog to the right, Fig. 2, into the path of rotation of the pin 82 to uncouple the said shaft 78 from the shaft 75, as above indicated.

The shaft 52 is provided with a bevel-gear 95, meshing with a similar bevel-gear 96 at the upper end of a vertical feed-reversing shaft 97, on which the feed-wheel 98 is loosely mounted, but to which said feed-wheel is coupled when said feed-wheel is to be reversely rotated to return the work-clamp to starting position after the completion of a buttonhole. This coupling of the feed-wheel with the shaft 97 is effected by a pin 99, adapted to enter one of a series of holes 100 in the feed-wheel, said pin being carried by a head or disk 101 at the lower end of a shaft 102, adapted to slide vertically in the hollow shaft 97 and provided at or near its upper end with a collar 103, encircling the shaft 97 and attached to said shaft 102 by a pin or set-screw 104, which rotatively connects the two shafts, the said pin or screw passing through a vertical slot in the shaft 97 to permit vertical movement of the said collar on said shaft 97 when the inner shaft 102 is moved up or down to couple or uncouple the feed-wheel and the said shaft 97.

The collar 103 is provided with an annular groove 105, entered by a semicircular guide 106, having a swiveled connection with the forward end of a lever 107, pivoted to the arm 13 and connected by a link 108 at its rear end to the lower arm of the bell-crank lever 88, which is in turn connected with the treadle-controlled rock-shaft 68, as above described, so that when the machine is to be started after the clamp has been returned to its first position the returning coupling-pin 99 will be disconnected from the feed-wheel when the clutch-controlling arm 64 is operated from the treadle to start the machine.

The vertical shuttle-operating shaft 26 is provided with an eccentric 109, embraced by a yoke of a lever 110, fulcrumed on the screw 111 and connected by a link 112 to a swinging arm or lever 113, which operates the clutch-dog 114 to impart an intermittent rotary movement to the feed-wheel 98 in a well-known manner. The clutch-dog is caused to bite the annular flange on the lower face of the feed-wheel by a spring 196. Vertically movable with the shaft 102 is a screw 197, the head of which has a loose connection with the lower arm of a bell-crank or angular lever 198, the upper arm of which engages the spring 196 to cause the grip of the dog 114 to be released from the flange of the feed-wheel when the shaft 102 is coupled thereto for the purpose of reversing the said feed-wheel. The feed-wheel is provided in its upper face with a scroll cam-groove 115, entered by a pin 116 at the forward end of a lever 199, fulcrumed on the screw 200, said pin 116 entering a slot in the feed-lever 117, fulcrumed in an adjustable block 118, fixed to a bar 119, slidingly mounted in the bed-plate of the machine and held in any desired position of adjustment by a set-screw 120, passing through a slot in the said bed-plate. The feed-lever 117 is jointed at its forward end to a slide or feed plate 121, transversely movable in a suitable guideway in the bed-plate 13 and having notches 153 to engage the feed-pin 122, rigidly connected with the base-plate 123 of the work-clamp.

Seated in a circular recess in the bed-plate of the machine is clamp-turning disk 124, having on its lower face a toothed annulus or gear-ring 125, surrounding a circular opening in the center of said disk and meshing with sector-gear 126 on a sector-lever or mutilated disk 127, swinging on the screw 128 and having a second sector-gear 129 meshing with a mutilated or sector-gear 138 at the periphery of a cam-disk 130, fixed to and rotating with the feed-wheel 98. Pivoted to the bed-plate is a lever 131, the rear end of which is pressed against the edge of the cam-disk 130 by a spring 132, said cam-disk being partly cut away at its edge to form two small cams 133 and 134. The sector-lever 127 is provided with two notches 135 and 136 to be alternately engaged by a hook 137 at the forward end of the lever 131 to positively hold the said sector-lever stationary at the times the straight sides of the buttonholes are being stitched; but when in the rotation of the feed-wheel one of the cams 133 or 134 passes the rear end of the lever 131 the spring 132 will lift the hook 137 at the forward end of said lever out of that notch 135 or 136 of the sector-lever with which said hook may be engaged, thereby releasing said sector-lever from the locking-lever 131, and at such instant the sector-gear 138 engages the sector-gear 129 for the purpose of imparting a half-rotation of the work-clamp.

The cam-disk 130 is provided in its lower face with a cam-groove 139, entered by a pin 140 at the rear end of the long arm of an angular or bell-crank lever 141, fulcrumed at 142 to the bed-plate 13 and the short arm of which is provided with a pin 143, entering a slot 144 in a sliding plate 145, interposed between the sliding feed-plate 121 and a superposed disk 146, fixed to the bed-plate and provided with a guideway 147, extending lengthwise of the machine and in which guideway the plate 145 can have a limited movement. The clamp-guiding button 148, provided with the usual needle-throat 149, is fixed to and movable with the sliding plate 145, and the said button is closely embraced by the side and end walls of a slot 150, with which the clamp base-plate 123 is provided, so that in stitching the eyelet portion of a buttonhole the work-clamp can be given a proper sidewise movement from the cam-groove 139 through the connections just described.

The fixed disk 146, on which the clamp base-plate 123 rests and on which the clamp slides and turns, is provided with a clamp-guiding slot 151 of well-known form and having straight end portions and an intermediate semicircular portion for the reception of the feed-pin 122 of the clamp, and the clamp-turning disk 124 is provided with a slot 152, which registers with the straight portions of the guiding-slot 151 when the straight sides of the buttonholes are being worked, said slot being of proper length, so that its inner end will register with the curved or semicircular portion of the said clamp-guiding slot 151. The feed-pin 122 is of proper length to extend down through the guiding-slot 151 in the fixed disk or plate 146 and also through the notches 153 in the slide or feed plate 121 into the slot 152 of the clamp-turning disk 124.

From the described constructions and arrangement of parts it results that when the feed-plate 121 is reciprocated by the feed-lever 117 a notch 153 of said feed-plate will engage the feed-pin 122 and by moving said pin in a straight part of the guiding-slot 151 will impart a straight feeding movement to the work-clamp. When the first straight side of a buttonhole has been stitched and the feed-pin arrives at the inner end of the slot 152 in the clamp-turning disk 124, said feed-pin will be in register with one end of the curved portion of the said guiding-slot 151, and at this moment the clamp-turning disk commences its rotation and carries the said feed-pin out of its notch 153 in the feed-plate and into and around through the curved part of the said guiding-slot 151 to stitch the eye of the buttonhole. When said feed-pin arrives at the second straight portion of said guiding-slot, it will be carried into the second notch in the feed-plate, and the clamp will then be given its second straight movement to stitch the second or last side of the buttonhole. When the feed-wheel is reversed by a quick rotation from the returning shaft 52, the clamp is quickly returned to its first or starting position by an operation occurring in a reverse order to that just described.

The scroll cam-groove 115 in the feed-wheel 98 has a concentric or "dead" portion between the points $x\ x$, so that no movements of the feed-plate 121 will occur during the time the work-clamp is being turned either in stitching the eye of a buttonhole or in reversing the clamp, while during the times when the sides of a buttonhole are being stitched or when the clamp is performing straight movements in returning the sector-lever 127 is locked by the lever 131, as has been described, so that the clamp-turning disk 124 is at such times positively restrained from moving.

From the clamp base-plate 123 rise two standards 154, on which are pivotally supported blocks 155, to which the clamping-arms 156 are attached, said arms being normally lifted by springs 157, coiled about the pivot-pins for the blocks 155, so as to raise the clamping-feet 158 from the work-plate 159, rigidly attached to the clamp base-plate. The clamping-arms 156 are provided with blocks or projections 160, arranged to be engaged by depending arms of a clamp-closing rocker 161, pivoted on a pin 162, supported by the standards 154, and having a horizontally-extending arm 163, by which the said rocker may be operated in closing or opening the clamp.

The buttonhole punch or cutter is formed integral with or is attached to a vertically-sliding bar or shank 164, mounted in a block or standard 165 and normally held in a raised position by a lifting coil-spring 166. The block or standard 165 has a sliding connection with the clamp base-plate 123 by means of a foot-plate 167, rigidly attached to said block or standard, and which serves as a die-plate or cutting-block for the buttonhole punch or cutter, said die-plate or block fitting loosely longitudinally of the buttonhole-opening in the clamp in an opening 168 in the clamp base-plate, so that while the cutting device will follow the clamp in its turning movements the clamp will be free to move longitudinally of the buttonholes independently of the cutting device at times.

Figure 3:
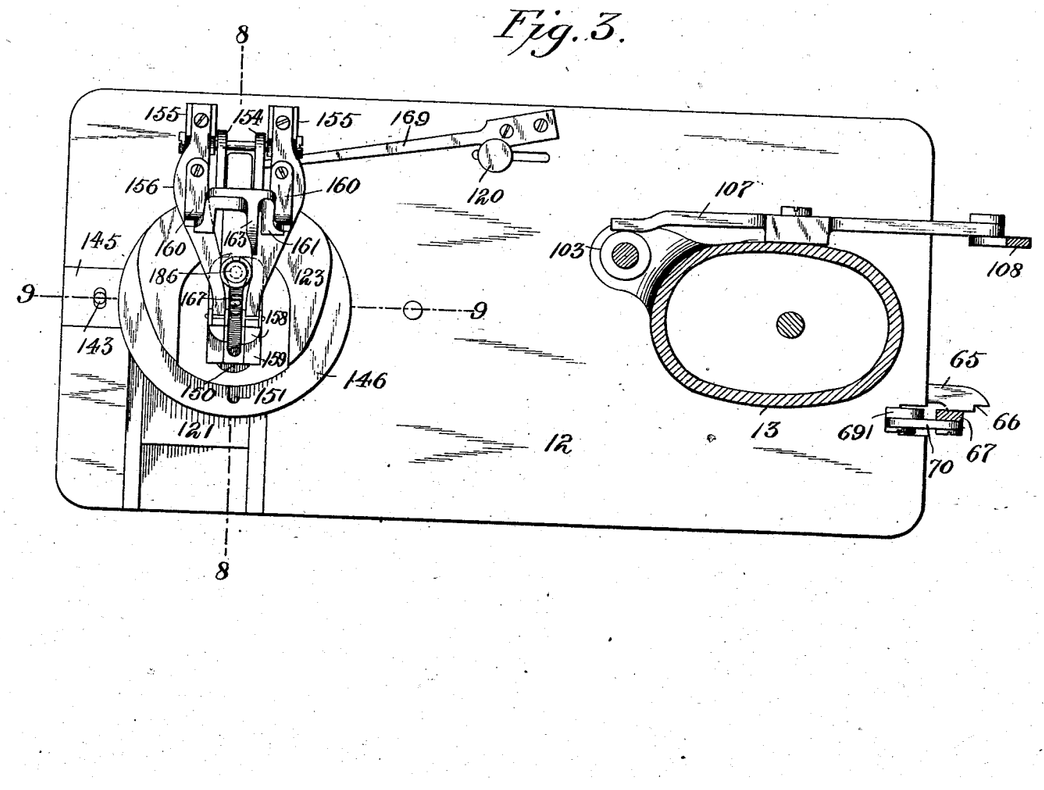
Fig. 3 is a plan view, partly in horizontal section on lines 3 3, Fig. 1, showing the work-plate and parts thereon or below.
Figure 4:
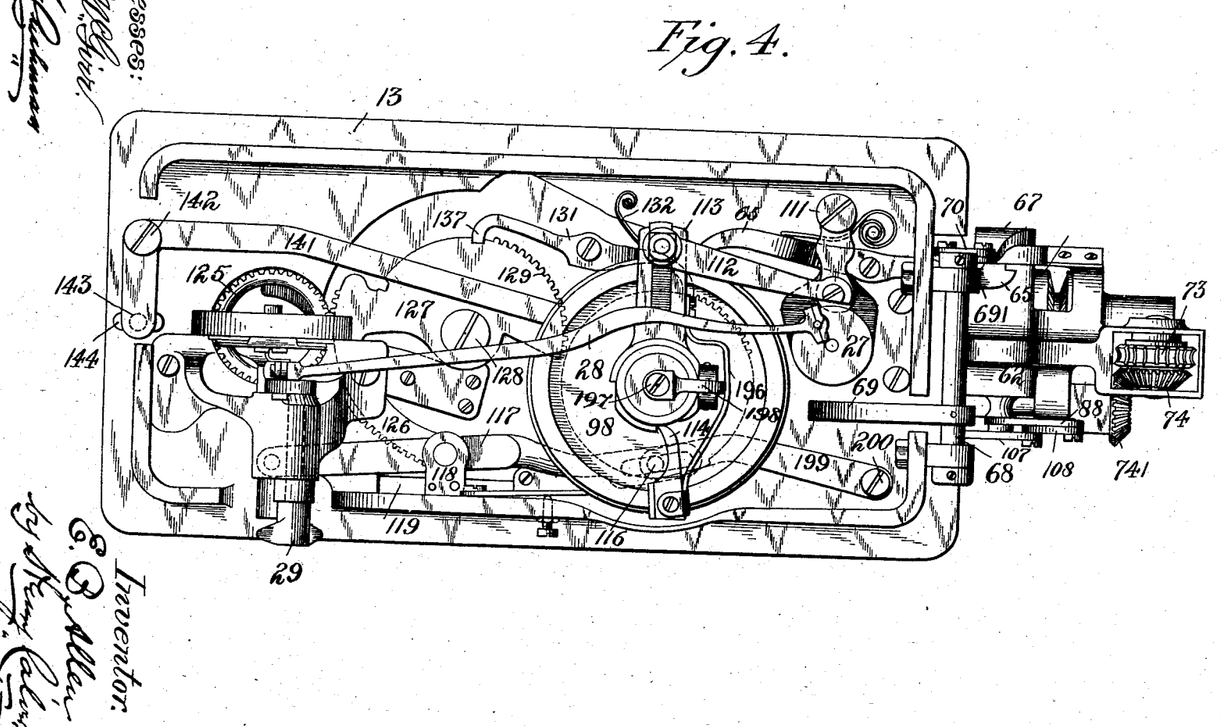
Fig. 4 is a bottom view of the machine.

Attached to the bed-plate of the machine is a spring 169, the free end of which presses against the outer end of the block or standard 165 to hold the concave inner end of the foot-plate or die-plate 167 in contact with the button when the clamp and cutting devices are in the cutting and stitching starting position. (Shown in Figs. 3 and 8.) While the first side of a buttonhole is being stitched the clamp moves forward, but the cutting devices remain stationary, and when the clamp is performing its turning movement in stitching the eye portion of the buttonhole the feed-pin moves in the curved portion of the guiding-slot 151 and the walls of said slot serve to continue to hold the said die-plate against the said button, so that the curved inner end of the said die-plate serves as an end wall for the smaller end of the slot 150 in the clamp base-plate to hold the clamp steady while being turned. In the last part of the returning or reverse movements of the clamp or in the last straight return movement thereof to bring the clamp to starting position the spring 169 holds the cutting devices stationary in cutting position, while the clamp slides or moves back independently of the cutting devices, this relative movement of the clamp to the cutting devices being a reversal of the relative movements of these parts when the first side and the eye portion of a buttonhole are being stitched. In stitching the last straight side of a buttonhole and during the first straight part of the returning movement the clamp and cutting devices will in the construction shown move together, but might move independently, if desired; but this is not necessary.

The punch or cutter is operated for its downward or working stroke by a vertically-reciprocating bar 170, on which is pivotally mounted a bell-crank lever 171, the shorter horizontal arm of which is connected with a spring 172, having a tendency to lift said arm, and thus move the longer vertical arm of said lever toward a pin 173 on the collar 174, secured to said needle-bar, and to which collar the needle-bar pitman 15 is connected. Loosely encircling the cutter-operating bar 170 is a collar 175, between which and a block 176, attached to the said bar 170, is interposed a coil-spring 177, serving to lift said bar 170 after it has been depressed for a punching or cutting operation. The lever 171 is pivoted to the block 176 and is provided near its lower end with a shoulder 178 to be moved into the vertical path of the pin 173 when the punching or cutting operation is to occur. The said lever 171 is provided with a notch 179 to be entered by a retaining finger or lug 180, with which the collar 175 is provided, to normally hold the said lever in such position that the shoulder 178 is out of the vertical path of movement of the pin 173, reciprocating with the needle-bar; but when a punching or cutting operation is to be effected the said lug 180 is lifted out of the said notch 179, thus leaving the said lever free to be moved by the spring 172, so as to bring the shoulder 178 into the path of the pin 173. To this end the collar 175 is provided with a horizontal arm 181, extending over the forward end of the clamp-returning shaft 52, which is provided with a projection or pin 182, which just before said shaft completes its revolution engages said arm 181 and lifts the lug 180 out of the notch 179, so that at the commencement of the next stitching operation the needle-bar at its first descent will depress the cutter-operating bar and cutter. When the lever 171 is swung toward the needle-bar in readiness for a cutting operation, the spring-depressed lug or holding-latch 180 rests on a horizontal shoulder 183 of the said lever adjacent to the notch 179; but when the needle-bar rises after its first descent the pin 173 will ride up an inclined edge or cam portion 184 of the lever 171 and swing said lever away from the needle-bar to a position to permit the lug or latch 180 to drop into the notch 179, and thus lock the cutter-connecting lever 171 in a position not to be further engaged by the reciprocating-pin 173 during the buttonhole-stitching operation.

The cutter-operating bar 170 is provided at its lower end with a block 85, arranged over the cutter-bar or cutter-shank 164, so that said bar 170 will depress the punch or cutter when it descends, and the said block is provided at one side with a groove 185, entered by a head or flange 186 at the top of the said bar or shank 164, so that the said block will lift the punch or cutter should the coil-spring 166 fail to do so. The block 184 is also arranged over the clamp-closing arm 163 when the clamp is in its initial or starting position, so that the descent of the cutter-operating bar 170 effects the closing of the clamp as well as the cutting or punching of the buttonholes.

Figures 1, 22, 23, 28:
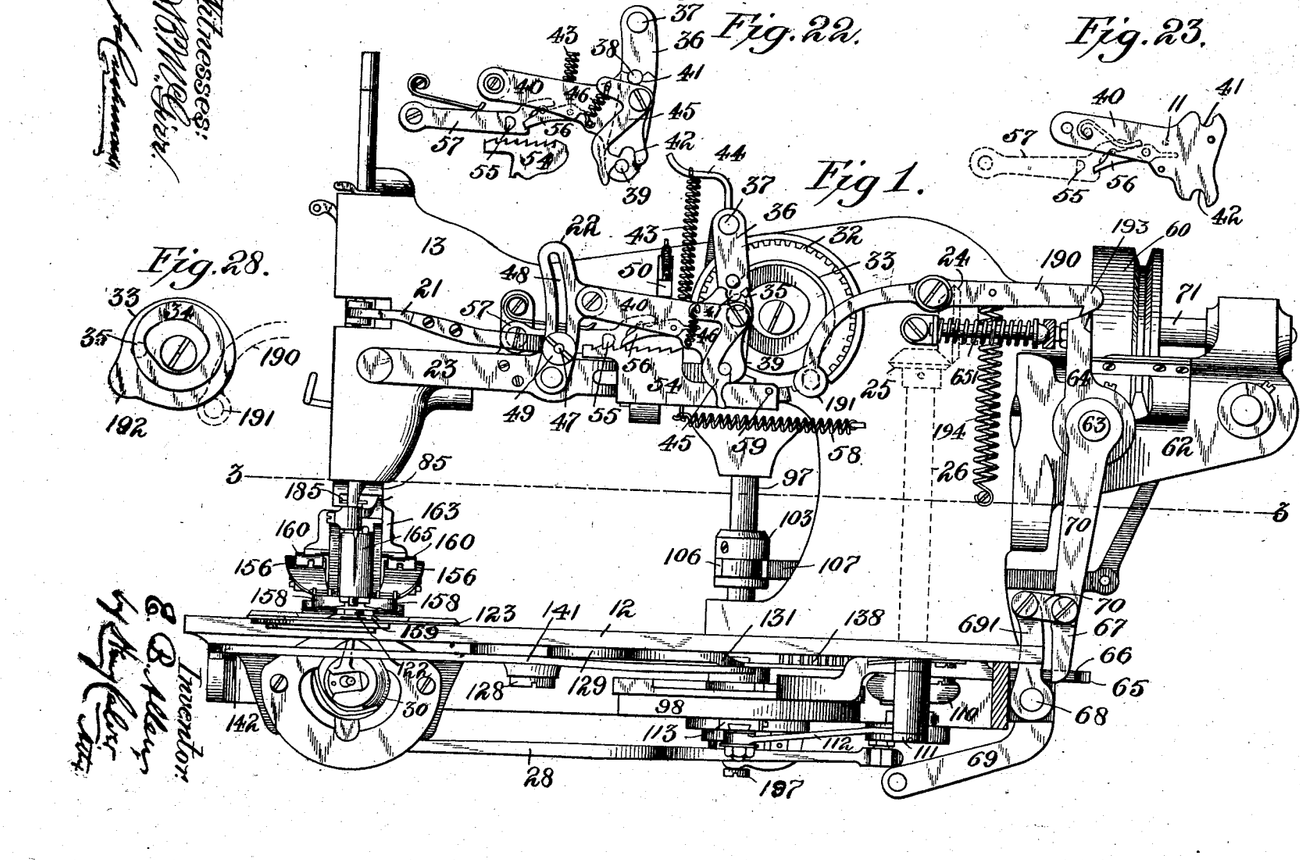
Figures 1 and 2 are opposite side views of a buttonhole-stitching machine embodying the invention.
Figs. 22 and 23 are detail views of part of the mechanism for moving the needle-bar laterally with the parts in position for overseaming operation in Fig. 22.
Fig. 28 is a detail view to show the needle-bar-shifting cam-wheel.
Figures 5, 6, 7, 8, 9:
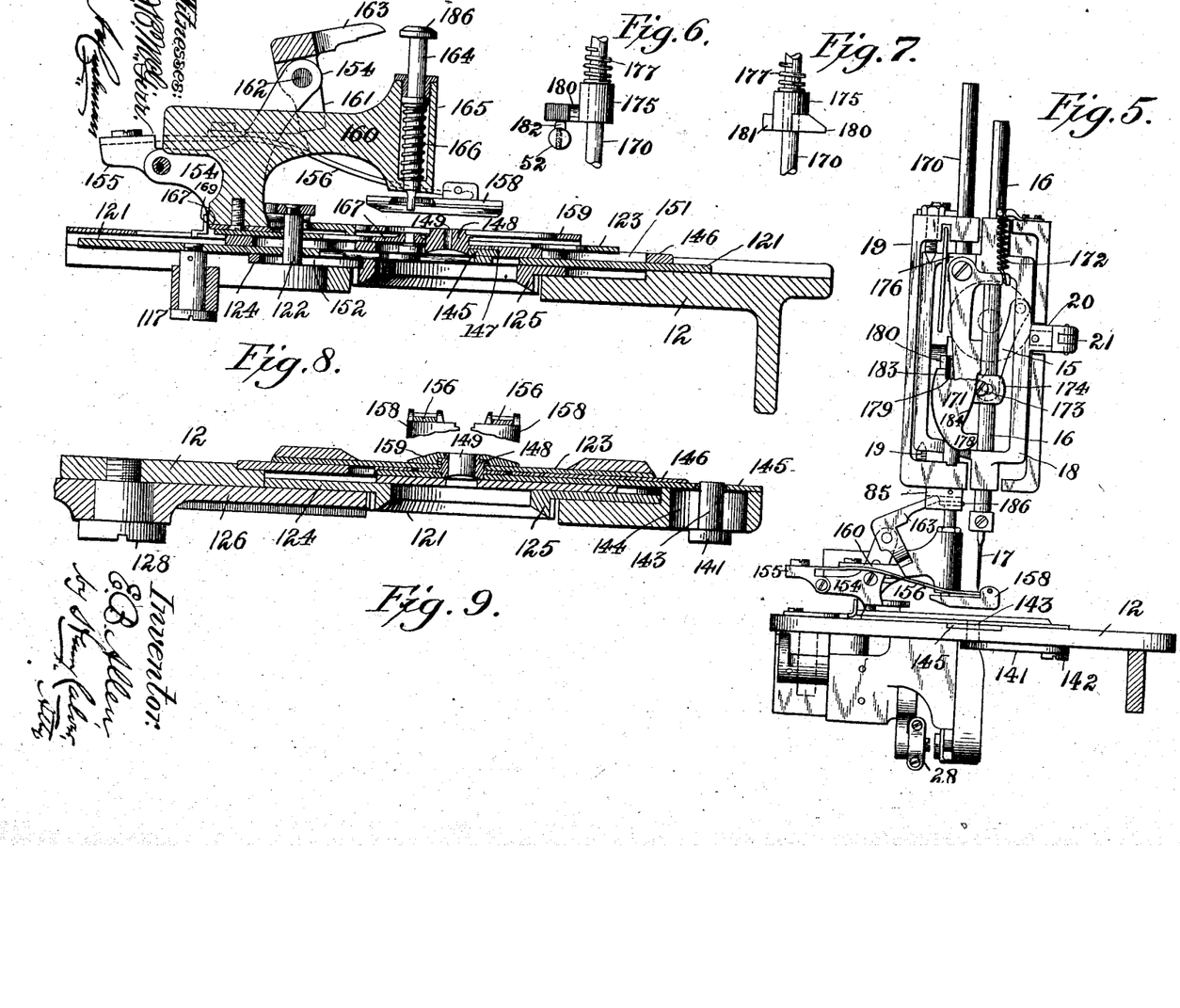
Fig. 5 is a front end view of the same.
Figs. 6 and 7 are detail views showing the locking device for the cutter-actuating lever.
Fig. 8 is a vertical section of the work-plate and parts above the same on line 8 8, Fig. 3.
Fig. 9 is a similar section on line 9 9, Fig. 3.
Figures 10, 13, 14:
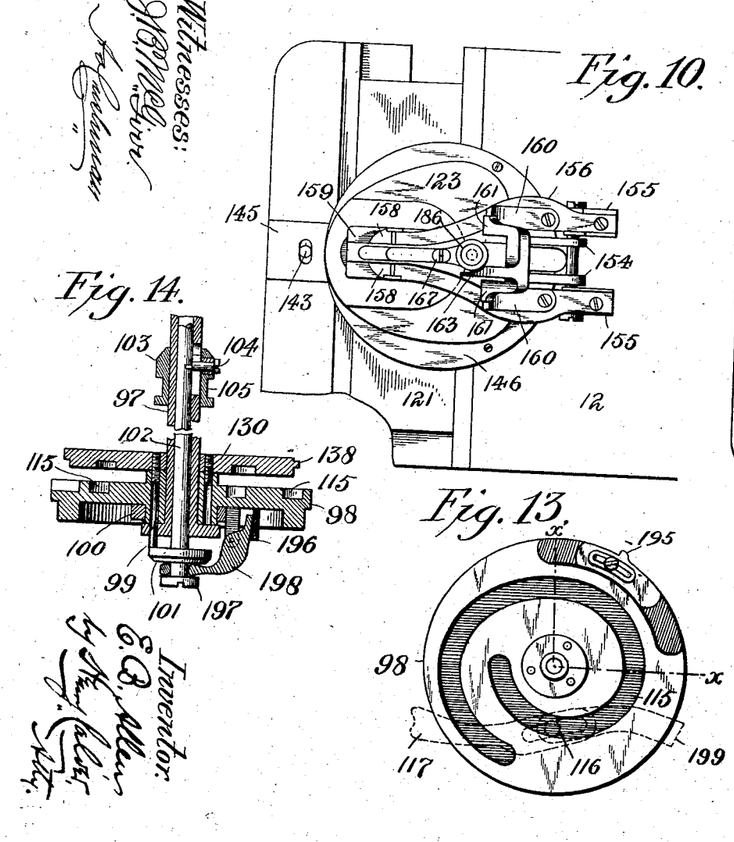
Figs. 10 and 11 are plan views showing the work-clamp in different positions.
Fig. 13 is a detail plan view of the feed-wheel to show the cam therein from which the longitudinal feeding movements of the work-clamp are derived.
Fig. 14 is a detail vertical sectional view to show the connecting means between the feed-wheel and its reversing-shaft.
Figure 11:
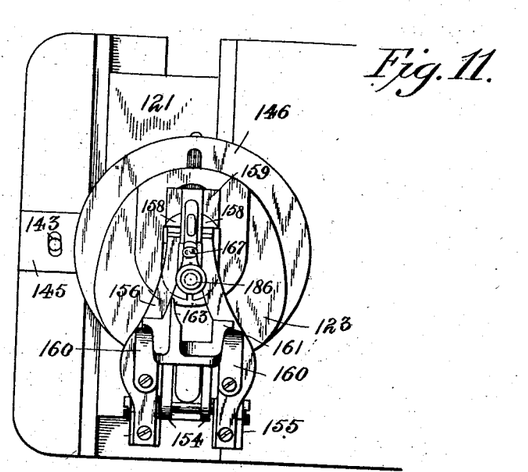
Figure 12:
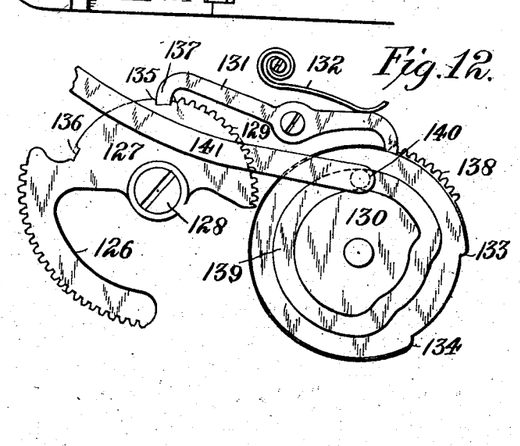
Fig. 12 is a detail view showing part of the work-clamp-turning mechanism.
Figures 15, 17, 18:
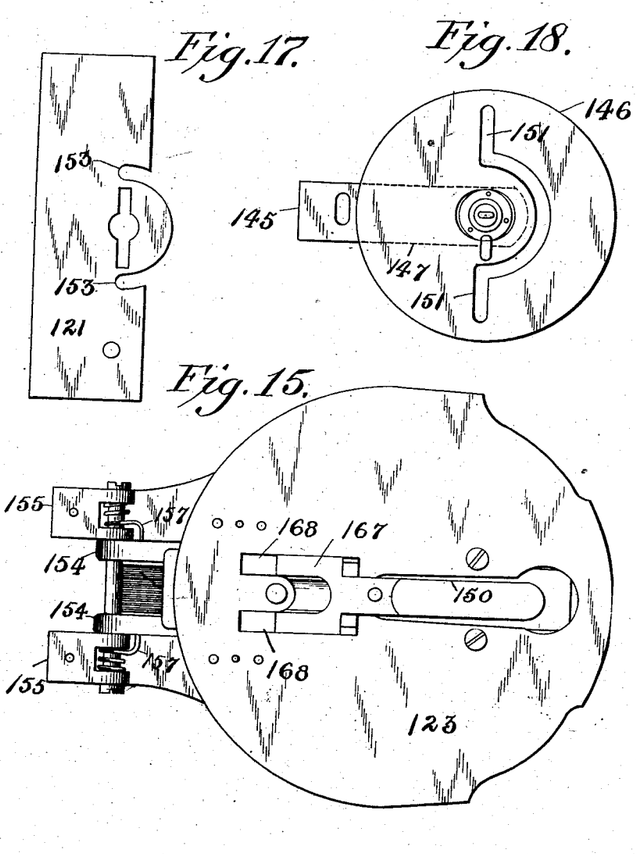
Fig. 15 is a bottom view of the work-clamp and cutter-die plate.
Figs. 16, 17, and 18 are detail views of parts of the clamp turning and guiding devices.
Figures 16, 19, 20, 21:
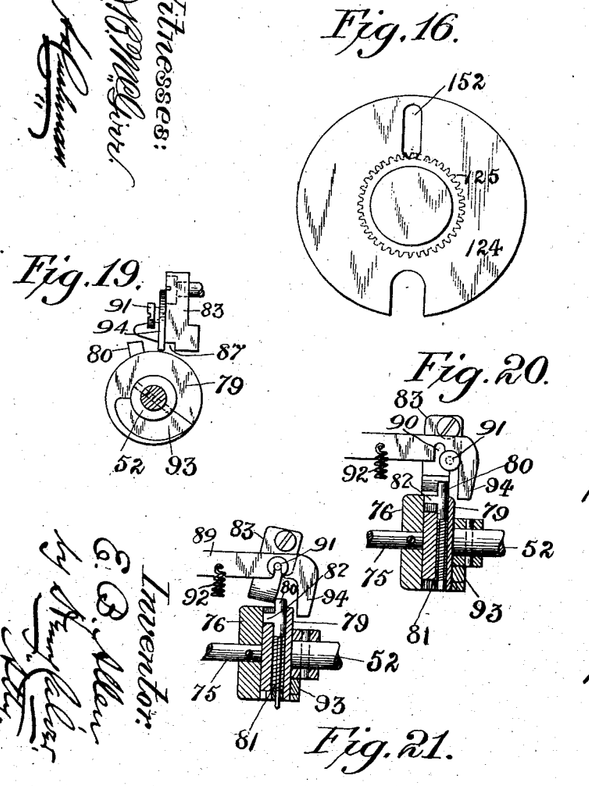
Figs. 19, 20, and 21 are detail views of the clutch connections between the clamp-returning shaft and its operating continually-running shaft.
Figures 24, 25, 26, 30, 31:
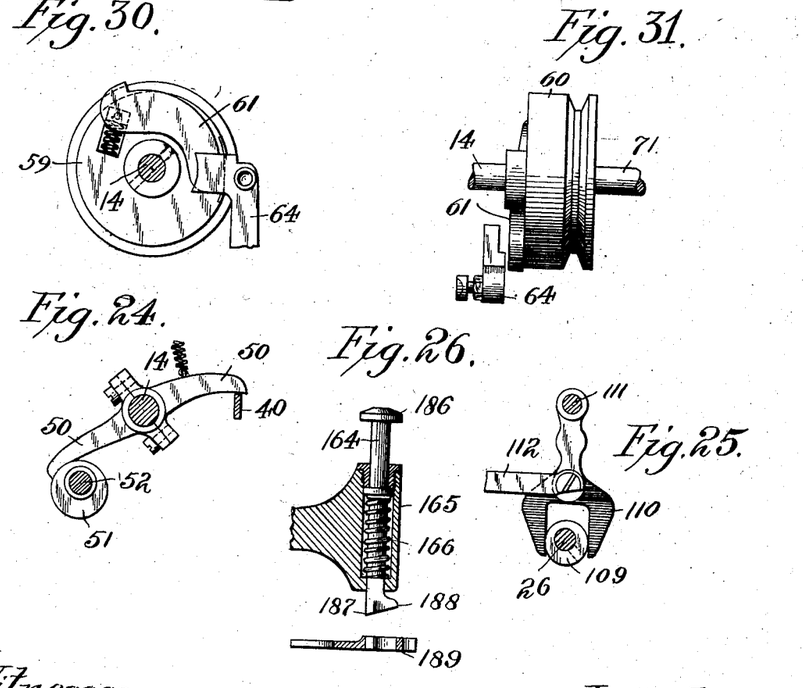
Fig. 24 is a detail view of the mechanism for moving the needle-bar connections to barring position.
Fig. 25 is a detail view of part of the feed-operating mechanism.
Figs. 26 and 27 illustrate one form of cutting device.
Figs. 29, 30, and 31 are detail views to show the clutch mechanism and some of the continuously-running parts operated from the loose pulley.
Figure 27:
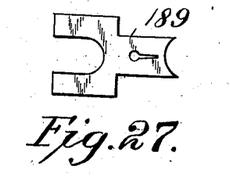
Figure 29:
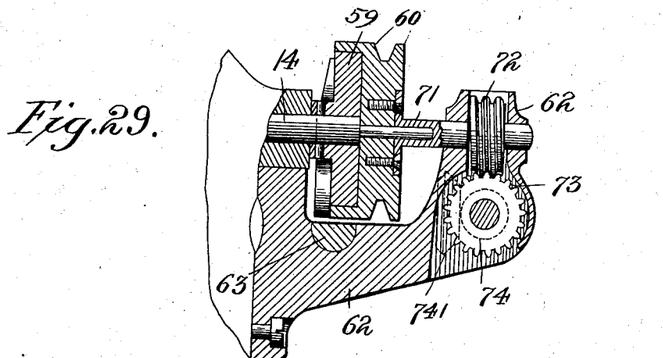

The punch or cutter may be of any desired form, according to the style of buttonhole to be cut and worked. For most kinds of buttonholes on cloth-work the punch or cutter and the coöperating die will comprise an oval punch portion 187 to form the eye of the buttonhole and a blade portion 188 to cut the straight portion of the buttonhole, and the die-plate or cutting-block 189 will be of corresponding shape, as shown in Figs. 24 and 25, while for forming buttonholes with round eye portions and the straight portions of which are to be cut after the stitching operation a round punch and correspondingly-shaped die-plate, as shown in Figs. 1, 8, and 15, will be employed.

In the operation of the present machine the long barring-stitches are formed at the commencement of a buttonhole-stitching operation, and the last stitch of a buttonhole is an edge-covering stitch at the completion of the working of the last side of the buttonhole. To make this last stitch complete, with no loose thread-ends, the last descent of the needle should be in the material and not at the slit side of the overseam, or, in other words, the last descent of the needle should be a depth-stitch descent. To insure a stoppage of the machine on a depth-stitch descent of the needle, the guard-lever 190, pivotally mounted on the bracket-arm 13, is provided. The said guard-lever carries at its inner end a pin or roller-stud 191, to be engaged at proper times by a cam 192 on the periphery of the cam-wheel 33, from which the lateral movements of the needle-bar and needle are desired, said lever having at its rear end a hook 193 normally drawn downward by the spring 194 to engage the upper end of the clutch-controlling arm 64, so that when the tripping-lug 195 on the feed-wheel engages the tripping-lever 65 to release the arm 67 of the rock-shaft 63 and to which shaft the clutch-controlling arm 64 is rigidly attached the said clutch-controlling lever, although now otherwise free to be moved by its spring 651 into stopping position, will be restrained from such movement by the hook 193 until the needle-bar and needle have been moved by the cam-wheel 33 into depth-stitch position and the needle-bar rises after a depth-stitch has been formed, when the cam 192 will lift the hook 193, and thus fully release the clutch-controlling arm 64, and the driving-shaft of the machine will then be stopped, with the hook 193 resting on the top of the arm 64.

The general operation of the machine is as follows: The attendant adjusts the work in the clamp and then lifts the treadle-controlled arm 69, which, through the connections described, moves the clutch-controlling arm 64 away from the clutch-dog 61 on the clutch-wheel 59 to connect said clutch-wheel to the continuously-running loose pulley 60, and thus set the driving-shaft in motion. At the first descent of the needle-bar the clamp is closed and the buttonhole punched or cut from the cutter-operating bar 170, forced downward by the pin 173, moving with the needle-bar, as described. At the last rotation of the clamp-returning shaft 52 in stitching the prior buttonhole the eccentric 51 thereon had operated the lever 50 to depress the connecting-bar 40 into engagement with the barring-pin 39, so that the first stitches of the sewing operation will be long barring-stitches across the end of the buttonhole, and when these barring-stitches have been completed the barring connection to the needle-bar is automatically changed to an edge-stitching connection, and the work is then fed beneath the needle, as described, to work the complete-eyed buttonhole, when the driving-shaft is automatically disconnected in the manner already set forth from the continuously-running power-driven loose pulley 60. The clamp-returning shaft 52 is by the hereinbefore-described connections with the stop-motion mechanism then coupled to the continuously-running shaft 75, and the feed-wheel is simultaneously coupled to the feed-reversing shaft 97 through the pin 99 in the head 101 of the vertically-movable shaft 102, connected with the stop-motion mechanism, as already stated, and a single rotation of the said shaft 52 causes the clamp to be quickly automatically returned to its cutting and starting position, the cutter-connecting lever 171 to be released from its holding lug or latch 180, and the connecting-bar 40 to be coupled to the barring-pin 39 in readiness for the next buttonhole cutting and stitching operation.

The invention is not to be understood as being limited to the details of construction or to the particular form of buttonhole-stitching machine herein shown and described, as many features of the invention are well adapted for use in machines for working and barring straight buttonholes, as well as for eyed buttonholes, or for use in double-chain-stitch buttonhole-machines instead of the lock-stitch overseaming-machine in connection with which the invention is herein illustrated.

Having thus described my invention, I claim and desire to secure by Letters Patent—

1. In a buttonhole-stitching machine, the combination with a work-clamp, and a feeding mechanism for spacing the overseaming or edge-covering stitches, of a stitch-forming mechanism comprising a horizontally-movable needle-bar and needle, means for varying the horizontal throw of the said needle-bar and needle, and a barring mechanism comprising means for automatically increasing the horizontal throw of the needle-bar and needle for the barring operations and which barring mechanism is of such construction that whatever may be the normal horizontal throw of the needle-bar and needle for the overseaming-stitches the horizontal throw of the needle-bar and needle for the barring-stitches will be proportionally larger.

2. In a buttonhole-stitching machine, the combination with a work-clamp and a feeding mechanism for spacing the overseaming-stitches, of a stitch-forming mechanism comprising a needle and a coöperating loop-taking device, means for changing the relative positions of the needle, and the work for forming overseaming-stitches, adjusting means for varying the lateral movements between the needle and the work to vary the width of the overseam, and a barring mechanism forming longer barring-stitches than the width of the overseam, and which barring mechanism comprises automatic means for proportionally increasing or diminishing the relative lateral movements between the needle and the work when the width of the overseam is changed; so that when the overseam is made wider or narrower the barring-stitches will be automatically made proportionally longer or shorter.

3. In a buttonhole-stitching machine, the combination with a work-clamp and a feeding mechanism for spacing the stitches about the buttonholes, of a stitch-forming mechanism comprising a needle and a coöperating loop-taking device, means for changing the relative positions of the needle and the work for forming overseaming and barring stitches and comprising two connected levers, a cam for operating said levers, automatic means for shifting a connecting device to different distances from the fulcrum of one of said levers for overseaming and barring stitches, respectively, and means for adjustably joining a connecting device to different distances from the fulcrum of the other of said levers to proportionally vary the lateral overseaming and barring movements.

4. In a buttonhole-stitching machine, the combination with a work-clamp and a feeding mechanism for spacing the overseaming or edge-covering stitches, of a stitch-forming mechanism comprising a horizontally-movable needle-bar and needle, a laterally or horizontally movable frame or gate in which the needle-bar reciprocates vertically, a lever for moving the said frame or gate laterally, a cam for operating said lever, a second lever, a connecting-bar jointed at one end to the said second lever, means for operatively joining the said connecting-bar with the said first-named lever, at different distances from the fulcrum of said first-named lever, for the overseaming and the barring stitches, respectively, automatic means for shifting the point of connection of said connecting-bar with said first-named lever for forming overseaming and barring stitches, and a link jointed at one end to said needle-bar frame or gate and adjustably connected at its other end to the said second lever; whereby, by changing the connection of the said pitman with the said second lever the horizontal throw of the needle-bar and needle will be varied, both for the overseaming and barring stitches, while the barring-stitches will always be of a length proportionally longer than the width of the overseam.

5. In a buttonhole-stitching machine, the combination with stitch forming and feeding mechanisms and a work-clamp, of means for closing the said clamp from the needle-bar at the first descent of the said needle-bar for a buttonhole-stitching operation.

6. In a buttonhole cutting and stitching machine, the combination with stitch forming and feeding mechanisms and a work-clamp, of a buttonhole cutting or punching device, and means for closing the said work-clamp from the needle-bar through the said cutting or punching device at the first descent of the said needle-bar for a buttonhole-stitching operation.

7. In a buttonhole cutting and stitching machine, the combination with a stitch-forming mechanism comprising a needle-bar provided with a pin or projection, of a work-clamp, a buttonhole cutting or punching device comprising a cutter-operating bar, a coupling-lever pivoted to said operating-bar and adapted for engagement by the said pin or projection on the said needle-bar, automatic means for causing said lever to be engaged by the said pin or projection on the needle-bar at a desired descent of the latter, and means for holding the said lever out of the way of the said pin or projection during other descents of the needle-bar; whereby the cutter-operating bar may be coupled to the needle-bar without rotary movement of said cutter-operating bar.

8. In a buttonhole-stitching machine, the combination with stitch-forming devices, of a work-clamp, means for imparting a semirotation to said clamp in stitching about the eye of a buttonhole, a feeding mechanism for moving the said clamp longitudinally to space the stitches along the sides of a buttonhole, and automatic means for reversing the movements of the clamp-feeding and clamp-turning mechanism, when a buttonhole has been stitched, to return the clamp to its first or starting position.

9. In a buttonhole-stitching machine, the combination with stitch-forming devices, of a work-clamp, means for imparting a semirotation to said clamp in stitching about the eye of a buttonhole, a feeding mechanism for moving the said clamp longitudinally to space the stitches along the sides of a buttonhole, and comprising a feeding cam-wheel, and automatic means for reversing the movements of the clamp-feeding cam-wheel, when a buttonhole has been stitched, to return the clamp to its first or starting position.

10. In a buttonhole-stitching machine, the combination with stitch-forming devices, of a work-clamp mounted for partial rotation in stitching about the eyes of buttonholes, a feeding mechanism for moving the said clamp to space the stitches and comprising a feeding cam-wheel, an operating device for imparting an intermittent forward rotary movement to the said cam-wheel during a buttonhole-stitching operation, automatic mechanism for reversing the movements of the said cam-wheel when a buttonhole has been stitched, to return the clamp to its first or starting position, and means for disengaging the said operating device from said cam-wheel when the latter is to be reversed.

11. In a buttonhole-stitching machine, the combination with stitch-forming devices, of a work-clamp mounted for partial rotation in stitching about the eyes of buttonholes, a feeding mechanism for moving the said clamp to space the stitches and comprising a feeding cam-wheel, an operating clutch-dog for imparting an intermittent forward rotary movement to the said cam-wheel during a buttonhole-stitching operation, automatic mechanism for reversing the movements of the said cam-wheel when a buttonhole has been stitched, to return the clamp to its first or starting position, and means for disengaging the said operating clutch-dog from said cam-wheel when the latter is to be reversed.

12. In a buttonhole-stitching machine, the combination with stitch-forming devices, of a work-clamp, means for imparting a semirotation to said clamp, in stitching about the eyes of buttonholes, a feeding mechanism for moving the said clamp longitudinally to space the stitches along the sides of a buttonhole, automatic means for reversing the clamp turning and feeding mechanism to return said clamp to its first or starting position, a start and a stop motion mechanism comprising a loose pulley, a continuously-running shaft operatively connected with said pulley, and automatic means, connected with the start and stop motion mechanism, for coupling the clamp-returning mechanism with said continuously-running shaft when the driving-shaft of the machine is stopped.

13. In a buttonhole-stitching machine, the combination with stitch-forming devices, of a work-clamp mounted for partial rotation in stitching about the eyes of buttonholes, a feeding mechanism for moving the said clamp to space the stitches, automatic mechanism for returning the clamp to its first or starting position, a start and a stop motion mechanism comprising a loose pulley, a continuously-running shaft operatively connected with said pulley, automatic means, connected with the start and stop motion mechanism, for coupling the clamp-returning mechanism with said continuously-running shaft when the driving-shaft of the machine is stopped, and treadle-operated means for disconnecting the clamp-returning mechanism from the said continuously-running shaft when the machine is to be started at the next buttonhole-stitching operation.

14. In a buttonhole cutting and stitching machine, the combination with stitch-forming mechanism, of a work-clamp mounted for partial rotation in stitching about the eyes of buttonholes, a feeding mechanism for moving the said clamp to space the stitches, automatic means for returning the said clamp to its first or starting position after a buttonhole has been stitched, a buttonhole cutting or punching device, a locking device for holding the cutting device inoperative during the stitching of a buttonhole, and means, forming part of the clamp-returning mechanism, for releasing said locking device to set the cutting mechanism in readiness for operation at the first descent of the needle-bar at the commencement of the next buttonhole-stitching operation.

15. In a buttonhole-stitching machine, the combination with stitch forming and feeding mechanisms, of a work-clamp mounted for partial rotation in stitching about the eyes of buttonholes and having a guiding-slot, a guiding-button fitting closely in said slot at the position of the clamp for its turning movement, and means for moving said button laterally during the eye-stitching operations.

16. In a buttonhole-stitching machine, the combination with a stitch-forming mechanism, of a work-clamp mounted for partial rotation in stitching the eyes of buttonholes, a feeding mechanism for moving the clamp along for the side stitching of buttonholes and for turning the clamp during eye-stitching, and automatic means for locking the clamp-turning mechanism during the side-stitching operations and for releasing the locking device for the eye-stitching operations.

17. In a buttonhole-stitching machine, the combination with a stitch-forming mechanism comprising a laterally-movable needle-bar and needle, of a work-clamp, a feeding mechanism for said work-clamp, a stop-motion device, a tripping device for the said stop-motion device, and a controlling device for the said stop-motion device and which is independent of said tripping device; whereby the machine may be stopped at a predetermined sidewise movement of the needle-bar and needle.

18. In a buttonhole stitching and barring machine, the combination with a stitch-forming mechanism, a work-clamp and a feeding mechanism for spacing the stitches, of means for changing the relative horizontal positions of the needle and the work for forming overseaming-stitches, means for increasing the relative horizontal movements of the needle and work for barring-stitches, and means, operated from a shaft rotating independently of the driving-shaft of the machine, for setting the parts for barring operation.

19. In a buttonhole stitching and barring machine, the combination with a work-clamp and a feeding mechanism for spacing the stitches, of a stitch-forming mechanism comprising a horizontally or laterally movable needle-bar and needle, means for increasing the lateral throw of the needle-bar and needle for the barring-stitches, and means, operated by a shaft rotating independently of the driving-shaft of the machine, for setting the parts for barring operation.

20. In a buttonhole stitching and barring machine, the combination with a work-clamp and a feeding mechanism for spacing the stitches, of a stitch-forming mechanism comprising a horizontally or laterally movable needle-bar and needle, a stop-motion device, means for increasing the lateral throw of the needle-bar and needle for the barring-stitches, and means, operated by a shaft rotating independently of the driving-shaft of the machine, for setting the parts for barring operation after the movement of the said driving-shaft has been arrested by the said stop-motion device.

In testimony whereof I affix my signature in presence of two witnesses.

EDWARD B. ALLEN.

Witnesses:
JOSEPH NELLIS,
BESSIE GONDER.